J. H. CHADWICK.
Making White Lead.

No. 51,018. Patented Nov. 21, 1865.

Witnesses:

Inventor:

UNITED STATES PATENT OFFICE.

J. H. CHADWICK, OF BOSTON, MASSACHUSETTS.

IMPROVEMENT IN POTS FOR THE MANUFACTURE OF WHITE LEAD.

Specification forming part of Letters Patent No. 51,018, dated November 21, 1865.

*To all whom it may concern:*

Be it known that I, J. H. CHADWICK, of Boston, in the county of Suffolk and State of Massachusetts, have invented a new and useful Improvement in Pots for Corroding White Lead; and I do hereby declare that the following is a full, clear, and exact description thereof, which will enable others skilled in the art to make and use the same, reference being had to the accompanying drawings, forming part of this specification, in which—

Figure 1:
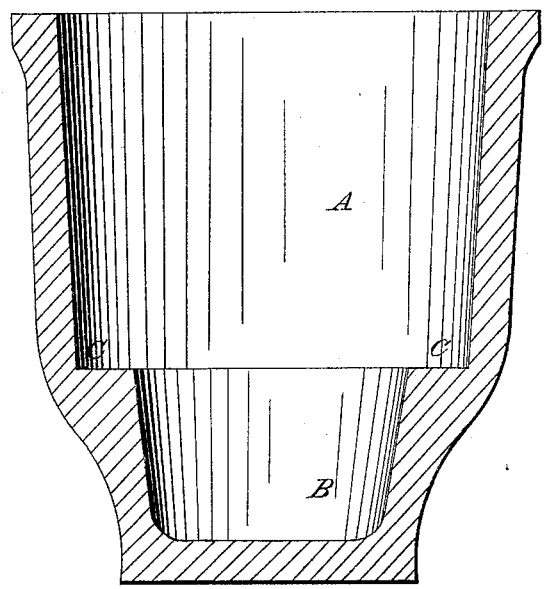
Figure 2:
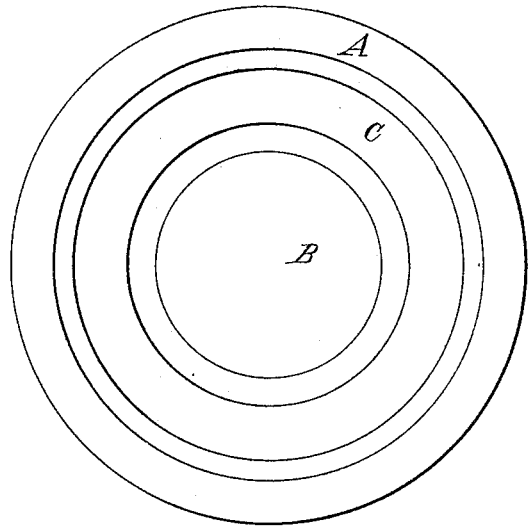

Figure 1 is a vertical section of a pot made according to my invention. Fig. 2 is a plan view thereof.

The object of this invention is the improvement of pots for corroding white lead; and it consists in forming at a suitable height within the pots an uninterrupted circular ledge, whereon the buckles of lead are allowed to rest. This ledge is made by contracting the diameter of the lower part of the pot, or, in other words, increasing the diameter of the pot above the part which forms the basin for the acid, so as to make a horizontal circular shelf, which divides the basin reserved for the acid from the space above, which is reserved for the buckles of lead. The pots are, in consequence of this construction, stronger than when made after the form in ordinary use and they are more easily cleaned. The buckles rest upon the ledge, which furnishes a broad surface for them to rest upon, so that they cannot easily be displaced or be crushed and broken down and forced into the acid.

The pots in general use in this manufacture are earthen, shaped like flower-pots, and have on their inner surfaces several knobs or projections, generally three in number, at equal distances apart, which knobs or projections sustain the buckles, the lowermost buckle resting immediately on the said projections and the others being laid above, one upon another, until the pot is full. This mode of constructing pots is objectionable because if the lowermost buckle becomes displaced from any cause it will fall into the vinegar or acetic acid in the bottom of the pot and become discolored thereby, and because that sometimes the great weight which presses on the lowermost buckle crushes it at one or more of the places where it is in contact with the projections, or else breaks off one or more of the projections, and consequently causes it and the adjacent buckle or buckles to become immersed in the acid. Furthermore, the said projections are very liable to become broken by the weight of lead put upon them, and the pots in which that occurs are thenceforth useless. Furthermore, it is difficult to cleanse the pots having projections, because the lower sides of the projections are not accessible, and consequently the lead becomes discolored more or less from the effects of the mucilage and other impurities left in the pots after their charges are removed.

My invention is designed to do away with these defects, and also to simplify the construction and increase the strength of pots used in this manufacture.

A designates a pot made after my invention. It is made so that the basin in the bottom for holding the acetic acid is separated from the upper part, where the buckles are placed, by a continuous horizontal shelf or ledge on the inner circumference of the pot at such a height as to suit the required depth of the basin. The lower part, B, of the pot A, which receives the acid, is made of considerable thickness and strength, with sides that rise almost in a vertical line until they reach a height suitable for the height of the basin B, when they recede in every direction, forming a continuous shelf, C, all around the inside of the pot. The sides of the pot ascend from the outer circumference of the shelf C up to the rim of the pot, whence it follows that the upper part of the pot is greater in diameter than the lower part containing the basin B, so that any substance or article which lies on the shelf or which extends across the basin with its ends resting on the shelf on opposite sides of the pot will not be liable to fall into the basin by being jostled or by reason of the displacement of its ends.

It will be observed that the shelf C has a solid base consisting of the walls of the lower part of the pot, so that it is not liable to be broken away in being handled or by the weight of lead put upon it. The pots which have knobs or projections on their inner sides are very liable to injury when the workmen are removing their charges, because the lead often slips down past one or more of the projections or is crushed down past one or more of them. When such accidents occur the workmen often break away one or more of the projections in their attempts to release the lead, which, when in a corroded state, is expanded in bulk, and consequently becomes wedged below the projections.

My invention will prevent losses which would occur from the causes just mentioned, and will also prevent loss and damage from the discoloration of the lead in consequence of the immersion of any of the buckles or of any part of them in the acid. The buckles are also sometimes jostled or pushed off the knobs or projections into the acid, or the latter become crushed and broken when the upper part of a pot becomes broken, and the weight of the upper courses is thereby allowed to come upon the charge or mass of buckles in the broken pot. The knobs or projections give way when such an event takes place because they are not liable to sustain the great pressure amounting often to many hundreds of pounds. Such accidents cannot occur with pots made according to my invention because the shelf C is not only continuous around the interior of the pot, but also because it is sustained by the solid sides of the lower part thereof.

In cleaning the pots after their charges are removed, one workman can clean ten pots made according to my invention during the time it would take him to clean one made with knobs or projections after the ordinary style.

Another advantage which attends the use of pots made after my invention is found in the character and quality of the lead corroded in them, which is produced in a whiter condition, because the lead is not allowed to drop into the acid and become discolored.

I claim as new and desire to secure by Letters Patent—

In pots for corroding or producing white lead, forming a shelf all around their inner sides along or near the top of the basin which receives the acid, substantially as and for the purpose above-described.

J. H. CHADWICK.

Witnesses:
J. VAN SANTVOORD,
M. M. LIVINGSTON.